United States Patent [19]

Debes et al.

[11] Patent Number: 4,553,369
[45] Date of Patent: Nov. 19, 1985

[54] AUTOMATIC CONTROL SYSTEM FOR X-RAY FILM CASSETTE LOADER AND UNLOADER APPARATUS

[75] Inventors: Michael H. Debes, Bear; Paul C. Keenan, III, Newark, both of Del.

[73] Assignee: E. I. Du Pont de Nemours and Company, Wilmington, Del.

[21] Appl. No.: 553,468

[22] Filed: Nov. 18, 1983

[51] Int. Cl.$^4$ .............................................. B65G 65/04
[52] U.S. Cl. .................................... 53/55; 53/76; 53/237; 53/266 R; 53/382; 414/411; 493/11
[58] Field of Search ............... 53/52, 266 C, 237, 238, 53/382, 266 R, 55, 58, 67, 64, 75, 76, 77; 414/411, 403; 493/11

[56] References Cited

U.S. PATENT DOCUMENTS

| | | | |
|---|---|---|---|
| 3,150,263 | 9/1964 | Catlin | 53/266 R |
| 3,555,768 | 1/1971 | Miller | 493/11 X |
| 3,888,587 | 6/1975 | Perl | 414/411 X |
| 4,049,142 | 9/1977 | Azzaroni | 414/411 X |
| 4,354,336 | 10/1982 | Azzaroni | 414/411 X |
| 4,480,423 | 11/1984 | Müller | 414/411 X |

*Primary Examiner*—James F. Coan

[57] ABSTRACT

An automatic X-ray film unloading and loading apparatus is actuated by sensing indicia on the cassette to perform various operations on the cassette and/or the film therein.

4 Claims, 6 Drawing Figures

AUTOMATIC CONTROL SYSTEM FOR X-RAY FILM CASSETTE LOADER AND UNLOADER APPARATUS

FIELD OF THE INVENTION

This invention concerns X-ray equipment and, more particularly, an apparatus for automatically unloading an exposed film sheet from a cassette and subsequently loading the cassette with a fresh film sheet.

BACKGROUND OF THE INVENTION

Automatic daylight X-ray film handling systems using cassettes have come into increased use in recent years. Typically such systems include apparatus for receiving an X-ray cassette containing an exposed X-ray film sheet, subsequently automatically opening the cassette, removing the exposed film sheet, placing an unexposed sheet in the cassette and closing the cassette.

U.S. Pat No. 3,150,263 describes such an apparatus, in which a plurality of predetermined size film sheet stacks are stored in individual magazines for loading into cassettes. In operation, a given X-ray cassette is inserted into a chamber which is then made light tight. The cassette is received onto a supporting rack and a system of microswitches determines the cassette size in terms of length and width. A control system, responding to the microswitch determination, opens the cassette lid, removes a film sheet from within the cassette for delivery to a storage means, selects an unexposed film sheet of a size commensurate with the cassette from the plurality of film sizes stored in the magazines, delivers the selected film sheet to the cassette, closes the cassette lid and ejects the loaded cassette. Similar apparatus is shown in U.K. published application No. 2,068,586A and U.S. Pat. No. 4,049,142.

In most such apparatus, the operator input is eliminated and microswitches or photodetectors, strategically placed in predetermined positions within the apparatus, detect the actual size of the cassette in order to determine the film size that must be dispensed to the cassette. Such apparatus is limited in its usefulness since it can only respond to the physical dimensions of the cassette, and is not able to detect and respond to film type or to perform other functions. In cases where (1) cassettes of similar dimensions but containing different types of intensifying screens must be loaded with different types of film, as contrasted to different size of film; (2) the inserted cassette may contain unexposed film to be first unloaded prior to loading with fresh film; (3) there is need to provide an additional exposure of patient identification information on the unloaded film as it exits the cassette, the prior art apparatus is unable to fulfill the need.

In other apparatus for automatically unloading and loading X-ray cassettes, the operator is required to input the information regarding film size and type. This is accomplished by a control panel on the outside of the apparatus. An operator may select a number of functions that the machine should perform for a particular cassette and film inserted. Unfortunately, such manual programming is prone to error. For example, if the operator inadvertently misprograms or malprograms, the result could be jamming of the machine, loading the wrong film type into the cassette or worse, damaging an exposed film by not removing it, or exposing a film with the wrong patient identification.

BRIEF STATEMENT OF THE INVENTION

Many of these problems associated with the prior art automatic loading and unloading X-ray apparatus are reduced by this invention in which information is stored on each cassette relative to its size, type and condition, i.e., empty, etc. This information is read by the apparatus on insertion of the cassette and used to actuate a preselected sequence of operations.

More specifically, an apparatus for automatically unloading exposed X-ray film from a cassette and reloading the cassette with unexposed film having a light-tight chamber having means for insertion and withdrawal of the cassettes; a film holding magazine rack support adapted to hold a plurality of film-holding magazines, each containing an unexposed X-ray film sheet of a predetermined size, means to release on demand from one of the magazines a single sheet of a predetermined size and/or type film; cassette-opening means to open the lid of the cassette, removing means to remove an exposed film from the cassette, transfer means to transfer a sheet of film from one of the magazines to the cassette, closing means to close the cassette, and control means responsive to a control signal to selectively actuate the release means, cassette opening means, film removing means, transfer means and closing means, is improved by positioning: indicia on the cassette denoting operations to be performed, based on size and/or type, on the cassette and/or the film therein, and means for sensing the indicia and providing the control signal in response thereto to the control means.

With this invention, the problems associated with operator error are significantly reduced. Each cassette controls the automatic unload/load apparatus to properly unlock and open the cassette, select the proper replacement film, unload the used film and reload the cassette with the selected film. Alternatively other operations may be performed on the film, each under the control of the indicia on the cassette.

BRIEF DESCRIPTION OF THE DRAWINGS

The operation of the apparatus of the present invention will be hereafter described and illustrated with the aid of the following drawings.

DETAILED DESCRIPTION OF THE INVENTION

Figure 1:
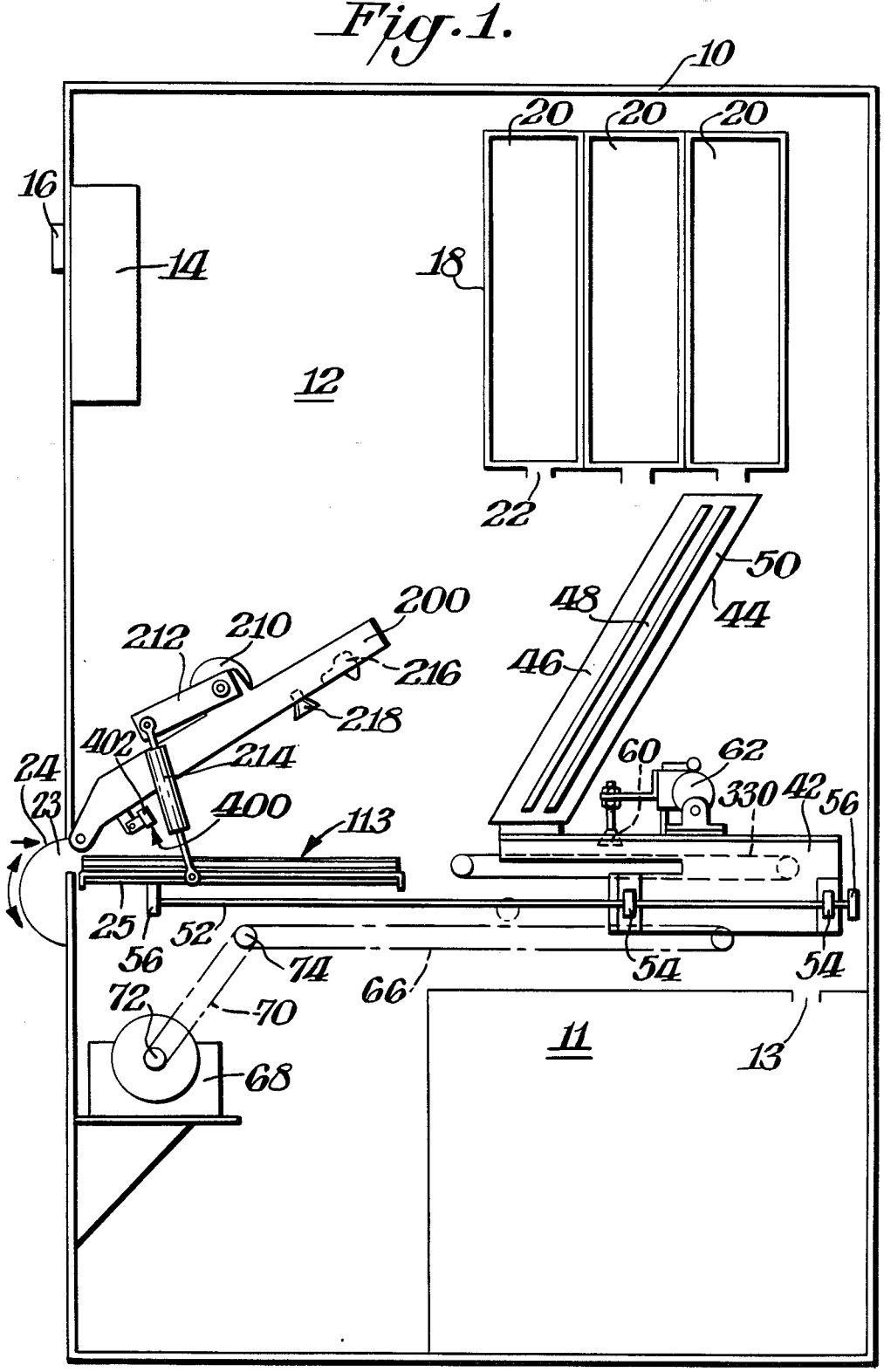
FIG. 1 is a schematic representation of a typical automatic cassette loading and unloading device.

Throughout the following detailed description similar reference numerals reference to similar elements in all figures of the drawings.

Referring to FIG. 1 there is shown in schematic representation the main elements of an automatic daylight film handling apparatus, typical of the type known in the prior art, modified in accordance with this invention. Such prior art apparatus is described in detail in pending Application Ser. No. 444,087 filed Nov. 24, 1982 by W. A. Hoorn, the contents of which are incorporated herein by reference. This apparatus, which is typical of the automatic film cassette loading and unloading apparatus for which the present control system is useful, comprises an enclosure 10 forming a light-tight chamber 12. On one side of the enclosure 10 there is mounted a console 14 which houses an electronic controller. The electronic controller includes a programmable microprocessor such as an 8085 manufactured by Intel Corp., and conventional input/output circuitry to receive input signals from sensors and to provide output signals to control various motors or other elements in response thereto on the basis of preprogrammed instructions. This console 14 may communicate through a panel 16 with the outside of the enclosure 10 providing appropriate signals to an operator indicating what functions are performed, when the task of reloading a cassette is completed, etc.

These automatic apparatus include a film magazine rack 18 containing a plurality of film magazines 20. In the apparatus depicted, the rack 18 is mounted near the upper portion and rear of the enclosure 10. The orientation of each of the magazines 20 is such as to hold a stack of X-ray film along its edge in a generally verticial position. Not shown in FIG. 1 are appropriate means by which each of the magazines 20 may be removed from the enclosure. Removing the magazines from the enclosure is necessary to permit reloading the magazines with fresh film. The reloading operation must be done under light-tight conditions in an appropriate dark room, usually away from the automatic apparatus.

As described by Hoorn, the magazine rack 18 at its lower end contains slots 22 for film delivery from the several film magazines. These slots 22 cooperate with exit slots (not shown) in each of the magazines 20. On one side of the enclosure 10, usually the same side on which the display panel 16 is located, there is placed an entry slot 23 which is covered and uncovered by a rotary access gate 24. When the access gate 24 is in the closed position, chamber 12 is light-tight. Immediately behind the entry slot 23, there is placed a cassette receiving rack 25.

Within chamber 12 there are also mounted two transporting guide rails 52 extending substantially horizontally from the back wall of enclosure 10 to near the entry slot. The rails 52 are located slightly below the cassette receiving rack 25 and on either side of the rack.

Slidably mounted on these guide rails through slide bearings 54 is a film transport carriage 42. The upper portion of carriage 42 comprises a film holder 44 having a number of film compartments 46, 48 and 50 which are sized to hold film sheets of various size and/or type in a specific position. A film release gate (not shown) is located at the bottom end of the film holder 44. End of travel blocks, shown as elements 56, limit the movement of the carriage on the guide rails 52. Electronic detectors (not shown) detect the position and length of travel of the carriage 42 and control its movement.

Also mounted within the enclosure is a motor 68 which through a gear reduction system 72 and an arrangement of timing belts 70 and 66 and gear 74 drives the film transport carriage 42 along guide rails 52. The electronic control system in console 14 controls motor 68 and moves the film carriage 42 to a preselected number of positions along the guide rail 52.

Placed substantially in line with and behind the rack 25 is a second belt drive system shown generally by numeral 330 which is arranged to guide a film sheet placed thereon to a film receiving means 11 (which can be a film developing apparatus) through a light gate 13. This developing apparatus or other film receiving means may have its functions controlled through the same electronic control housed in console 14. Or in the alternative, it could be an independently controlled developing apparatus simply placed in an appropriate receiving enclosure within chamber 12 or outside.

Located above the cassette receiving rack 25 is a cassette lid opening arm 200. This arm is driven through a motor 210 which through an arm 212 and a damping piston 214 is connected to the cassette receiving rack 25. Operation of the motor 210 results in the arm 200 being lowered to a position adjacent the rack 25 to contact a cassette lid and unlock the lid. Thereafter, the arm 200 is raised to a position angled from said rack, thereby raising the lid to open the cassette through a system of dogs 216 and suction cups 218.

Also located within enclosure 12, but mounted on the carriage 42 is an arrangement comprising a number of suction cups 60 driven through a suitable mechanical linkage (not shown) by a motor 62. This operation of the motor 62 results in the selective lowering and raising of suction cup 60.

Figure 2:
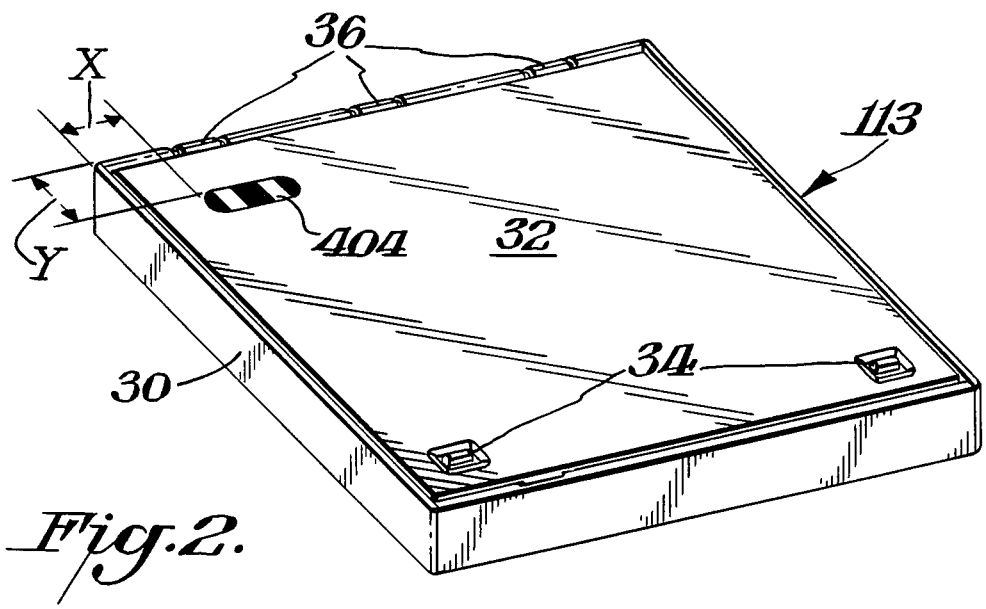
FIG. 2 is a schematic representation of a coded cassette constructed in accordance with this invention.

A book type cassette 113 is shown in FIG. 2. Such cassette has a body portion 30 and a lid 32. The lid 32 is hingedly mounted on the body through hinges 36 and held in the closed position through latches 34. On the lid, at a predetermined distance x and y from one corner of the cassette are code markings 404 which in the preferred embodiment may be a system of high and low reflectivity areas such as a combination of six black and white bars. The markings 404 may be painted on the cassette or placed on the cassette lid by the use of an adhesive backed label or by printing or otherwise. As described in detail in the aforementioned Hoorn application, rack 25 is so constructed that one corner of any size cassette inserted in the apparatus is always located at the same point. Thus far described, the automatic unload/load apparatus is that described in the Hoorn application. While so described, it is to be understood that the invention about to be described may be used with any automatic unload/load apparatus, i.e., those described in U.S. Pat. No. 3,150,263, U.K. Application No. 2068586A, merely as exemplary as it does not form a part of the invention.

In accordance with this invention, the identifying code markings placed on the lid of a cassette, such as that shown in FIG. 2, at a predetermined x and y distance from that corner will always be in the same place relative to the cassette lifting arm 200 regardless of cassette size. A photodetector sensor 400 covering an area commensurate with the area containing the code markings is placed on the arm 200. It is located at a position such that when a cassette is inserted on rack 25 and the arm 200 is in a first, standby position, i.e., adjacent to rack 25, the photodetector 400 will always be placed over the code markings 404 regardless of the cassette size.

Figure 3:
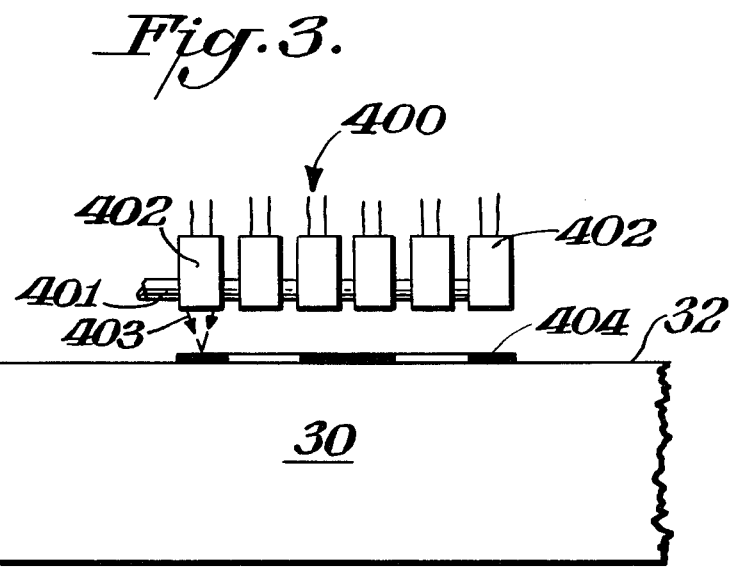
FIG. 3 shows a schematic representation of photodetectors that may be used to sense the coded cassette of FIG. 2.
Figure 4:
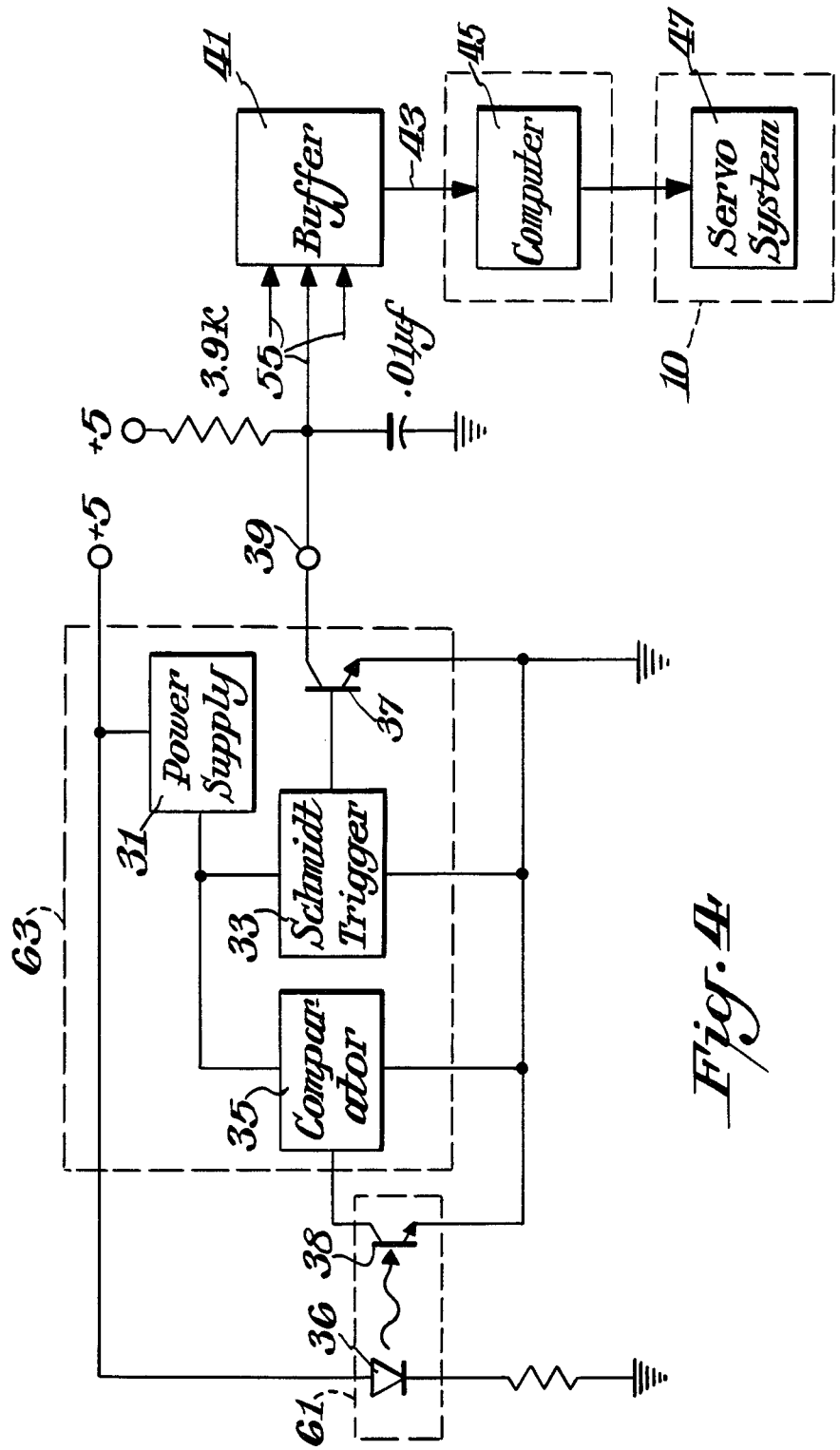
FIG. 4 is a partial block, partial circuit diagram of a photodetector assembly that may be used with the photodetectors of FIG. 3.

The photodetector sensor 400 may comprise a number of photodetector assemblies 402, as shown in FIG. 3, which are affixed on a bracket 401 which in turn is fastened on arm 200. Thus, with arm 200 in the standby position, light 403 emitted from each of the photodetector assemblies 402 is reflected by the code markings 404 on cassette lid 32 and received by the photodetector assembly 402.

Each photodetector assembly, which may be the model EE-SB5V manufactured by OMRON Co., comprises a coupled LED/phototransistor combination and associated electronic circuitry. As shown in FIG. 3, it comprises two modules. The first module 61 includes a light emitting diode 36 and a photodetector 38. The diode is powdered through an external +5V power source. The second module 63 also powered by an external +5V power source, includes a power supply 31, comparator 35, a Schmidt trigger 33 and an output transistor 37. The module output 39 from transistor 37, for each photodetector assembly 402 as denoted by the several input lines 55, is directed to a buffer 41 such as octal buffer 74 LS 244 made by Texas Instruments Inc. The output from this buffer 41 is applied to a computer 45 using in this instance an Intel #8085 microprocessor, located in control console 14. The computer 45 operates the servosystem 47 which, as described, includes the several motors and solenoids used in the automatic unload/load apparatus. In the preferred embodiment, the signals from the photodetector assemblies are applied to the microprocessor in parallel as denoted. This information is operated upon by the microprocessor in accordance with the Basic listing shown in Addendum I.

Figure 5A:
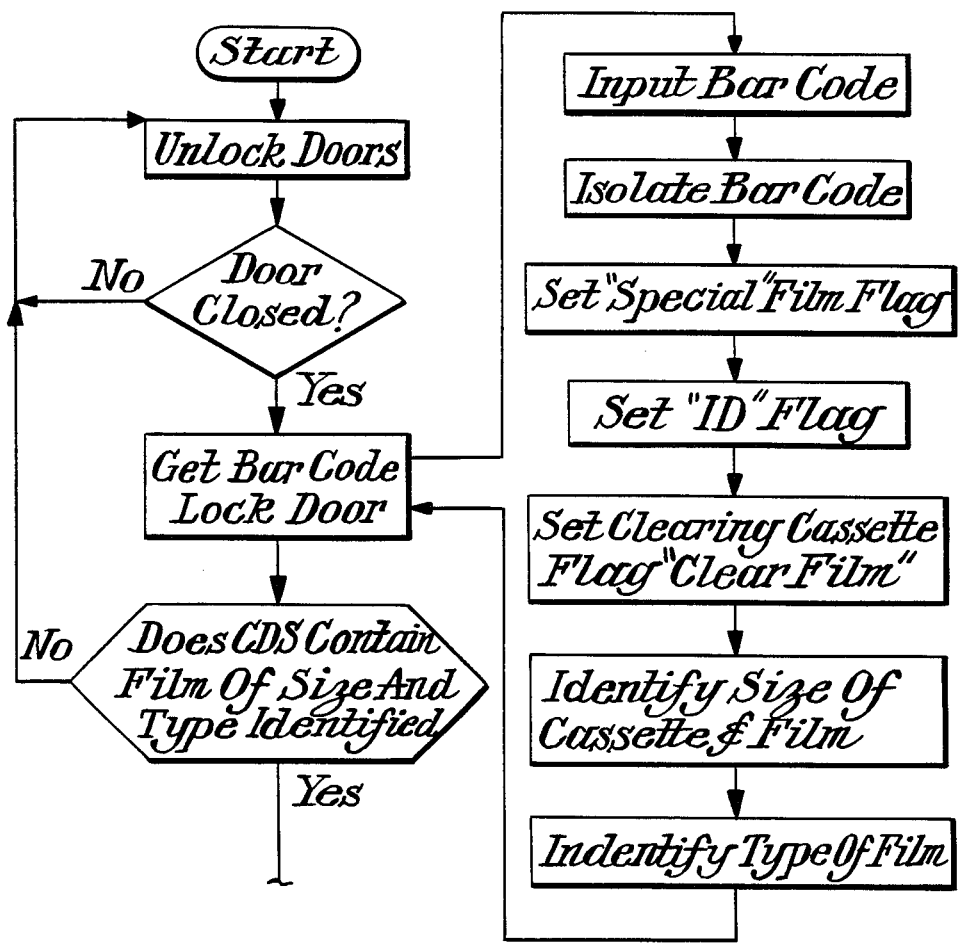
FIG. 5 is a flow chart of the microprocessor logic employed in this invention.
Figure 5B:
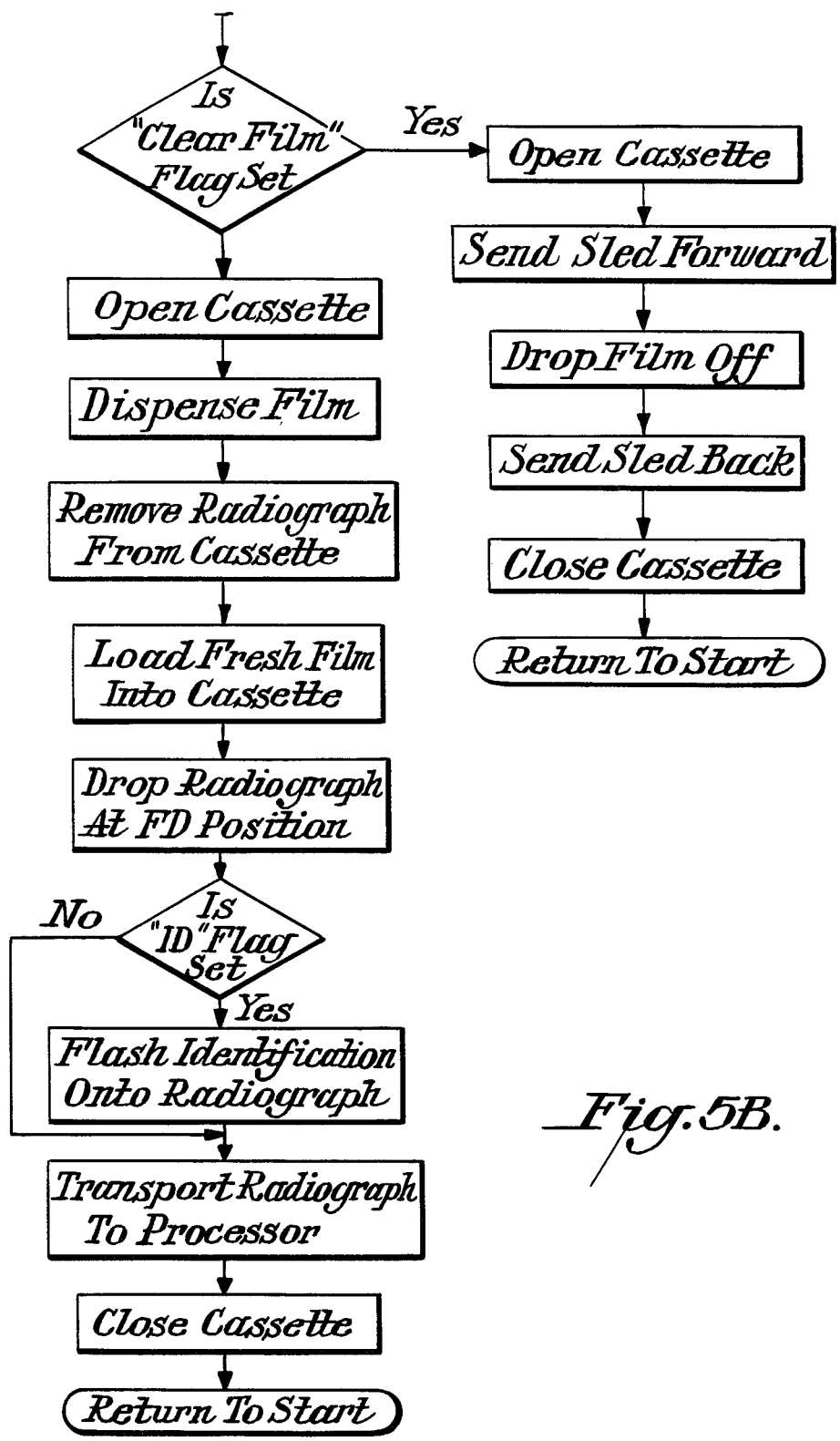

FIG. 5 is a flow diagram of a preferred control logic (implemented by the Addendum I listing) for an apparatus of the type described above. Following insertion of the cassette 113, the microprocessor thorough a sensor (not shown) ascertains that the door has been closed. If so, it proceeds to command the actuation of the lock mechanism for the door and next to sample the photodetector assemblies 402 to read the code 404 on the cassette lid. The code signal is isolated from other sensor inputs, and the film type and size of film information recorded and appropriate flags set, i.e., depending on the code read, flags are set to control, inter alia, (1) whether the exposed film in the cassette is to be further exposed with patient identification data, (2) whether the film is special, not requiring further identification, (3) whether the inserted cassette is a special cassette inserted in the machine simply to remove film that has been jammed in the film delivery path, or (4) whether a simple film unload/load operation is to be performed.

With the data input from the cassette code 404, the microprocessor control proceeds to determine the availability of the particular type and/or size of film required for the specific cassette inserted. If there is film available and if the cassette is not the type inserted to clear a film jamming condition, that is if the clear film flag is not set, the cassette is opened, i.e., the motor 210 and the associated mechanism for unlatching and lifting the cassette lid is actuated. An appriopriate film sheet is dispensed into one of the compartments, e.g., 48 of the film carriage 42. The carriage 42 is moved over the opened cassette and suction cup 60 lowered to pick up and remove the exposed film from within the cassette. A fresh film sheet from the compartment 48 is released into the cassette and the carriage retreats, to drop the exposed film onto transport belt 330. If the patient identification flag has been set, an exposure mechanism, not shown, is actuated, projecting the desired information onto a predetermined position on the film. The film is then transported through gate 13, the cassette lid closed and the system returns to the start condition.

If the clear film flag was set, the operation branches off as shown. The cassette is opened and the carriage 42 advanced over the cassette. No film is dispensed from magazines 20 into carriage 42. The film drop gate of carriage 42 is again actuated in an effort to release any film jammed therein. The carriage then returns to its standby position, away from the cassette, the cassette lid is closed and the program returned to the start condition.

It should be recognized that while the implementation of this invention is given in terms of one specific embodiment such embodiment is given as an example and is not be considered as limiting. It is recognized that a traveling photodetector may be used producing serial rather than parallel signal output from a code imprinted on a label on the cassette. Or that other functions may be added in response to the code, such as reversing the patient identification exposure to render the message readable through the back of the film rather than the front, as is needed occasionally in X-ray examination. Or to direct the film to a processor or to a storage container. Or to control the film developing parameters in response to the type of film in the cassette.

Also, magnetic indicia may be placed on the cassette which are magnetic sensed and used to control the operation of the automatic unloader/loader. Whatever the indicia on the cassettes and whatever the sensors used, the idea of using each cassette to control the operation of the cassette unloader/loader results in reduced errors and faster operation. No operator interface is required. In another alternative the code markings 404 may be read with a hand held bar code reader prior to being placed in the automatic unloading/loading apparatus. In this case, of course, conventional bar code indicia will be used.

Those skilled in the art having the benefit of the teachings herein may perform various modifications which are to be considered within the scope of the following claims.

What is claimed is:

1. In an apparatus for automatically unloading exposed X-ray film from a cassette and reloading the cassette with unexposed film having a light-tight chamber having means for insertion and withdrawal of the cassettes; a film-holding magazine rack adapted to hold a plurality of film-holding magazines, each containing unexposed X-ray film sheets of a predetermined size, means to release on demand from one of the magazines a single sheet of predetermined size and/or type film; cassette-opening means to open the cassette, removing means to remove an exposed film from the open cassette, transfer means to transfer a sheet of film from one of the magazines to the open cassette, closing means to close the cassette, and control means responsive to a control signal to selectively actuate the release means, cassette opening means, film removing means, transfer means and closing means, the improvement comprising:
   indicia on the cassette denoting operations to be performed, based on film size and/or type, and/or the film therein; and
   means for sensing the indicia and providing the control signal in response thereto to the control means.

2. The apparatus of claim 1 wherein the indicia are regions on the cassette having different optical reflectivities.

3. The apparatus of claim 2 wherein the sensing means is an optical reflectivity sensing module.

4. The apparatus of claim 1 wherein the indicia are distinguishable magnetized regions and the sensing means is a magnetic film detector.

* * * * *